(12) United States Patent
Cho

(10) Patent No.: US 10,223,948 B2
(45) Date of Patent: Mar. 5, 2019

(54) THREE-DIMENSIONAL LABEL HAVING MOVING PATTERNS USING FINE PATTERNS AND MICROLENS

(71) Applicant: Sung Jae Cho, Anyang-is, Gyeonggi-do (KR)

(72) Inventor: Sung Jae Cho, Anyang-is, Gyeonggi-do (KR)

( * ) Notice: Subject to any disclaimer, the term of this patent is extended or adjusted under 35 U.S.C. 154(b) by 0 days.

(21) Appl. No.: 15/209,670

(22) Filed: Jul. 13, 2016

(65) Prior Publication Data

US 2016/0321967 A1 Nov. 3, 2016

Related U.S. Application Data

(62) Division of application No. 14/535,136, filed on Nov. 6, 2014.

(30) Foreign Application Priority Data

Aug. 11, 2014 (KR) .......................... 10-2014-0103809
Aug. 12, 2014 (KR) .......................... 10-2014-0104517

(51) Int. Cl.
*G09F 19/12* (2006.01)
*G02B 27/22* (2018.01)
(Continued)

(52) U.S. Cl.
CPC ........... *G09F 19/12* (2013.01); *G02B 3/0043* (2013.01); *G02B 3/0056* (2013.01);
(Continued)

(58) Field of Classification Search
CPC ............ G09F 19/12; G09F 2003/0213; G09F 2003/0276; G02B 3/0043; G02B 3/0075;
(Continued)

(56) References Cited

U.S. PATENT DOCUMENTS 7,738,175 B2 * 6/2010 Steenblik .................. B44F 1/10
359/619
8,739,711 B2 * 6/2014 Cote ..................... G02B 3/0006
112/402

(Continued)

FOREIGN PATENT DOCUMENTS

CN 101160208 A 4/2008
KR 10-1324764 B1 11/2013
KR 10-1341072 B1 12/2013

*Primary Examiner* — Kristina M Deherrera
(74) *Attorney, Agent, or Firm* — Patent Office of Dr. Chung Park

(57) ABSTRACT

A 3-D label is disclosed including moving patterns using fine patterns and microlenses, including a lens layer in which a pattern display unit having microlenses that are convex in a semicircumferential form arranged at specific intervals and to represent patterns formed in a pattern layer regardless of a visual field focal length and a secret unit placed on one side of the pattern display unit and displaying intended patterns formed in the pattern layer when a predetermined visual field focal length is reached are integrated and formed; and the pattern layer disposed under the lens layer and having patterns formed thereon so that the distance between the central point of each of the microlenses and the central point of an adjacent microlens is matched with the distance between the central point of each of pattern cells and the central point of an adjacent pattern cell in the state.

1 Claim, 21 Drawing Sheets

(51) Int. Cl.
  *G02B 3/00*    (2006.01)
  *G09F 3/00*    (2006.01)
  *G09F 3/02*    (2006.01)

(52) U.S. Cl.
  CPC ....... *G02B 3/0075* (2013.01); *G02B 27/2214* (2013.01); *G09F 3/02* (2013.01); *G09F 3/0292* (2013.01); *G09F 2003/0213* (2013.01); *G09F 2003/0276* (2013.01)

(58) Field of Classification Search
  CPC .. G02B 27/2214; G02B 27/11; G02B 3/0056; H04N 13/0404
  USPC .............. 359/619–620, 1–35, 463, 626, 466; 382/159, 135; 347/134; 428/199
  See application file for complete search history.

(56) References Cited

U.S. PATENT DOCUMENTS

| | | | |
|---|---|---|---|
| 2001/0030715 A1* | 10/2001 | Tabata | G02B 27/0172 349/15 |
| 2006/0289723 A1 | 12/2006 | Li et al. | |
| 2011/0000967 A1* | 1/2011 | Labrec | G06K 19/08 235/488 |
| 2013/0050819 A1* | 2/2013 | Holmes | G07D 7/0006 359/463 |
| 2014/0063611 A1* | 3/2014 | Raymond | B42D 15/00 359/619 |

\* cited by examiner

THREE-DIMENSIONAL LABEL HAVING MOVING PATTERNS USING FINE PATTERNS AND MICROLENS

RELATED APPLICATION

This application is a Divisional Application of U.S. patent application Ser. No. 14/535,136 for "THE THREE-DIMENSIONAL LABEL HAVING MOVING PATTERNS USING FINE PATTERNS AND MICROLENS" filed on Nov. 6, 2014.

CROSS REFERENCE TO RELATED APPLICATION

The present application claims the benefit of Korean Patent Application No. 10-2014-0103809 and 10-2014-0104517 filed in the Korean Intellectual Property Office on 2014, 08, 11 and 2014, 08, 12, the entire contents of which are incorporated herein by reference.

BACKGROUND OF THE INVENTION

1. Technical Field

The present invention relates to a three-dimensional (3-D) label which is attached to various products, such as bank bills, securities, passports, identification cards, cards, watches, caps, bags, clothes, bottles, and electronic goods, and in which patterns for checking whether or not a corresponding article is a genuine article are moved, wherein a plurality of microlenses is arranged in a lens layer at specific intervals, a pattern display unit is configured so that a pattern layer is formed of desired patterns formed by arranging pattern cells under the lens layer so that the distance between the centers of the arranged microlenses is the same or desired patterns formed by arranging pattern cells in a multiple of the distance between the central points of the microlenses on the basis of the central point of the microlens, a secret unit through which some of patterns are not seen when a focal length is not the same when some of the patterns are seen at the front of the lens layer, and patterns formed in the pattern layer can be checked to the naked eye through the secret unit when a focal length is identical with that of the secret unit.

Furthermore, patterns having the same letters or designs are formed. In order to be indicative of a movement of patterns, the patterns are formed in a forward direction and after the patterns are completed, patterns are formed in a backward direction. Accordingly, an effect that patterns disappear after they are generated, an effect that the shapes of the patterns are changed, an effect that the patterns are rotated 360°, or a visual effect that a moving image appears due to an optical illusion in which patterns move can be obtained.

2. Description of the Related Art

The resolution of color copiers and color printers is improved with the recent development of office automation equipment. Accordingly, problems in that the color copiers and the color printers are used for various crimes, such as forging bank bills, securities, passports, identification cards, and cards, appear in succession.

Precise printing technologies using special materials or special ink, such as intaglio printing, barcode, hologram, silver coin, fine letters, fluorescent ink, magnetic ink, partial exposure hidden lines, and front and rear sheet custom printing, have so far been used as means for preventing the copying and forgery of printed matter.

However, such special printing may simply make forgery difficult, but may not be used to fundamentally prevent forgery.

The reason for this is that the forgery technology of a specialized forgery organization is advanced along with the rapid growth of computer peripherals, such as high-resolution color copiers and color printers.

Hologram is a technology capable of representing a 3-D shape and refers to a technology capable of representing information about each of the parts of an object in a 3-D image form using an interference phenomenon between an object wave reflected from the object and a reference wave that goes straight at a different angle based on the characteristics of a laser.

The hologram technology is based on the principle that light is divided into two parts using a semi-transparent mirror using a laser having a single constant wavelength, an object wave that is a reflected wave is produced by projecting one of the two pieces of light onto an object, the other of the two pieces of light is projected onto a film so that the object wave and a reference wave generate an interference phenomenon on the film, and a 3-D image is represented when the object wave and the reference wave recorded on the film are played back.

Such a hologram technology is recently used as a method of assigning a forgery and alteration prevention function to the hologram technology by applying the hologram technology to bank bills, securities, gift cards, passports, driver's licenses, and cards, but is disadvantageous in that imitation forgery is not clearly determined because a resin layer for protection and a hologram metal layer of a reflection type are thermally transferred to a card and printed matter on which the resin layer and the hologram metal layer will be deposited without a change through a common adhesive layer.

In general, a label means that information about a thing, such as a product name or trademark, is attached to paper and is used to be indicative of the source of an article and the contents, quality, and components of a commodity.

Furthermore, a label may function to be indicative of a specific source of an article so that whether or not the article is a genuine article can be determined.

Recently, illegal reproductions of expensive masterpieces are frequently distributed. In order to retrain such a behavior, various methods of determining a genuine article are being developed.

Accordingly, one of the methods for determining a genuine article includes attaching a label using gilt tooling or a laser piece so that other people do not easily forge a genuine article.

However, such a method does not sufficiently achieve its object because a corresponding label may be easily copied with the development of a printing technology or a gilt technology. Furthermore, there has been developed a technology using a label in which a specific image is not displayed in a normal state, but a hidden image is displayed according to a change of a specific state so that a corresponding trademark is displayed only when the label is seen at a specific angle.

The method of displaying a hidden image includes a method of making a background painted with dyes or pigments different from the brightness or chroma of the image or a method of inducing a visual illusion by configuring a background or image using fine and complicated designs or symbols.

The conventional label fabricated by printing using dyes or pigments as described above only represents a simple 2-D image and is problematic in that the dyes or pigments are discolored due to ultraviolet (UV) rays.

In order to solve such problems, Korean Patent No. 1341072 "Label for Identifying Genuine Article Comprising Multiple Nano Structures and Stereoscopic Lenses" was previously registered.

The previously registered patent relates to a method of displaying an image without using dyes or pigments and is a configuration in which an image is combined with a stereoscopic lens.

In the previously registered patent, a stereoscopic lens sheet configured to include a plurality of nanostructures and to display a hidden image includes an identification mark formation unit, including a stereoscopic lens layer, a focal length layer, and an image formation layer, and a coupling member. The image formation layer of the identification mark formation unit includes an aggregate in which a plurality of nanostructures protruded at intervals and heights of 50 to 200 nanometers is arranged periodically and regularly. A medium having a refractive index different from that of the nanostructures and a focal length layer is formed between the nanostructures and the focal length layer. An image of a desired color and shape can be implemented using only a structural design without using dyes or pigments, and an image having a color and shape of a nano unit of 10 microns or less can be represented on a single sheet.

However, the previously registered patent is disadvantageous in that a manufacturing process is complicated because it includes the identification mark formation unit, including the stereoscopic lens layer, the focal length layer, and the image formation layer, and the coupling member. Furthermore, the previously registered patent is disadvantageous in that there is a limit to a 3-D representation and a manufacturing process is complicated because an image is displayed using the medium having a different refractive index between the nanostructures and the focal length layer. Furthermore, the previously registered patent is advantageous in that a hidden image may easily appear at angles and focal lengths other than a predetermined visual field focal length because the image formation layer displays a common image using the aggregate including the plurality of nanostructures protruded at intervals and heights of 50 to 200 nanometers and hidden image formation units are formed, but is disadvantageous in that an image placed at and displayed on a hidden image formation unit may be easily imitated because the image is simple and it may be limitedly applied to specific products because a process of fabricating a label is complicated and the thickness of a label is too thick.

Furthermore, the previously registered patent is disadvantageous in that a manufacturing process is complicated and commercial production is limited because air or a vacuum state is formed between the nanostructures repeated in uneven forms and the focal length layer in order to check a genuine article and prevent forgery in a hidden image formation unit. Furthermore, there is a need to consider a method of causing curiosity and preventing forgery by displaying dynamically moving patterns because people soon become bored with statically moving patterns.

PRIOR ART DOCUMENT

Patent Document (Patent Document 1) Korean Patent No. 1341072 "Label for Identifying Genuine Article Comprising Multiple Nano Structures and stereoscopic lenses"

SUMMARY OF THE INVENTION

Accordingly, the present invention has been made keeping in mind the above problems occurring in the prior art, and an object of the present invention is to provide a 3-D label attached to various products and configured to check whether or not a corresponding article is a genuine article and to prevent the forgery of an article, including a lens layer configured to have a plurality of microlenses arranged therein at specific intervals and a secret unit formed in the lens layer and configured to be capable of checking a hidden pattern to the naked eye in a predetermined focal length in the state in which a pattern layer having patterns formed thereon is placed under the lens layer. The secret unit precisely matches microlenses with patterns using a phenomenon in which formed patterns are spread or converged depending on whether or not the microlenses are precisely matched with the patterns when the distance between the central point of a microlens and the central point of an adjacent microlens is the same as the distance between the central points of pattern cells placed in order to implement patterns under the microlenses, so that the naked eye approaches a microlens and a secret pattern can be checked to the naked eye.

Another object of the present invention is to provide a 3-D label having moving patterns, wherein the distance between the central points of microlenses can be precisely matched with the distance between the central points of pattern cells in order to display a pattern hidden in a secret unit. Yet another object of the present invention is to implement the creation and destruction of a pattern, a change in the shape of a pattern, a change in the size of a pattern, the rotation of a pattern, and an optical illusion, such as a moving image in which a pattern looks like moving, in the pattern display unit and secret unit of a 3-D label depending on the sizes, shapes, and arrangement angles of patterns that are consecutively arranged.

In accordance with an embodiment of the present invention, a 3-D label in which patterns for checking a genuine article and preventing forgery move using fine patterns and microlenses includes a lens layer in which a pattern display unit configured to have a plurality of microlenses that are convex in a semicircumferential form arranged at specific intervals and to represent patterns formed in a pattern layer regardless of a visual field focal length and a secret unit placed on one side of the pattern display unit and configured to display intended patterns formed in the pattern layer when a predetermined visual field focal length is reached are integrated and formed; and the pattern layer disposed under the lens layer and configured to have patterns formed thereon so that the distance between the central point of each of the microlenses and the central point of an adjacent microlens is matched with the distance between the central point of each of pattern cells and the central point of an adjacent pattern cell in the state in which the pattern cells for implementing patterns in accordance with the respective microlens are arranged.

In order to represent an optical illusion that moves according to a change in the angle of a focal point, patterns including a plurality of the pattern cells under the lens layer are formed in a forward direction, and after the patterns are completed, patterns are formed in a backward direction. Accordingly, a 3-D label is provided by implementing a change in the disappearance of patterns after the patterns are generated, a change in the shapes of patterns, a change in the sizes of patterns, the rotation of patterns up to 360°, or a change of the motion of patterns by consecutively arranging the patterns at specific intervals as if the patterns move like a moving image.

Figure 1:
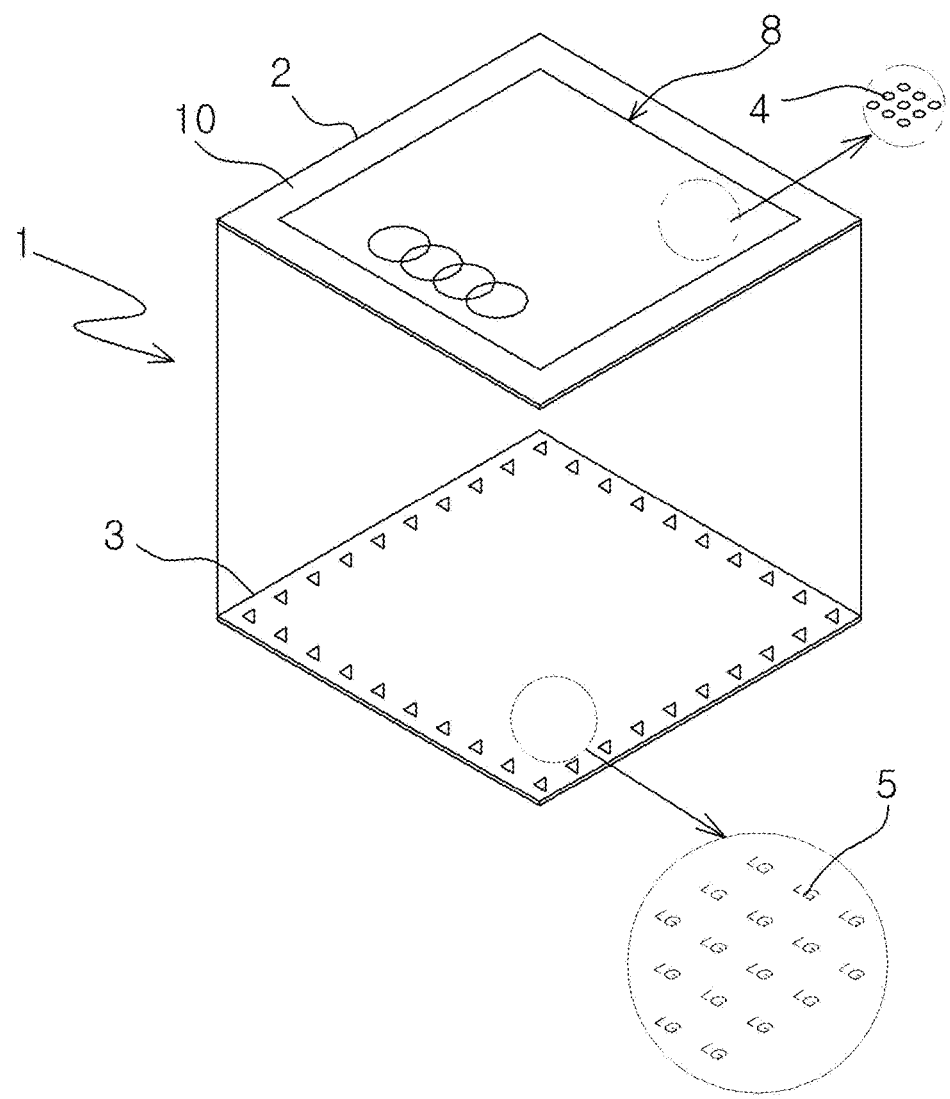
FIG. 1 is a dismantled perspective view illustrating a 3-D label in accordance with an embodiment of the present invention.

| <Description of reference numerals of principal elements in the drawings> | |
|---|---|
| 1: 3-D label | 2: lens layer |
| 3: pattern layer | 4: microlens |
| 5: pattern cell | 6: finishing deposition |
| 7: logo print region | |
| 8a, 8b, 8c, 8d: first, second, third, fourth regions | |
| 8: secret unit | 9: pattern display unit |

DETAILED DESCRIPTION

Some exemplary embodiments of the present invention for achieving the aforementioned objects and effects are described in detail with reference to the accompanying drawings.

Figure 2:
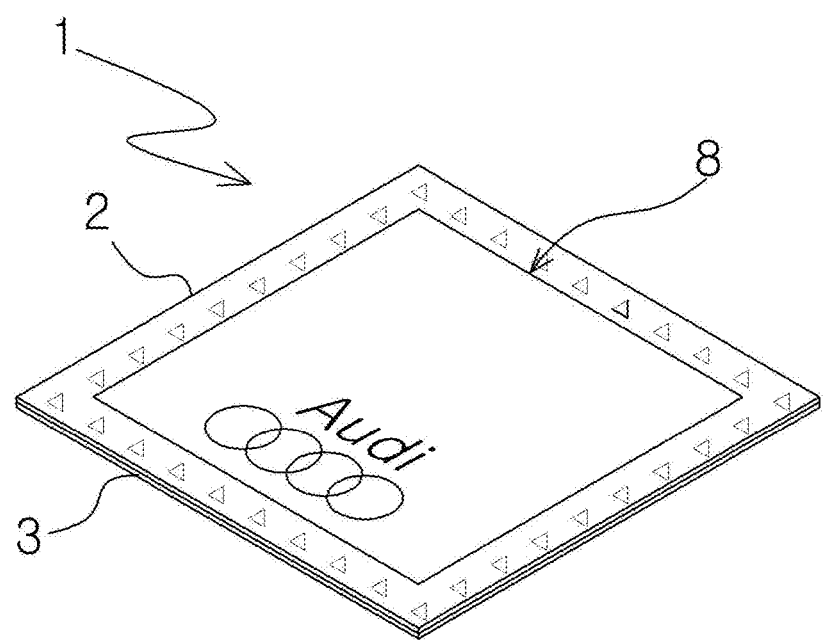
FIG. 2 is an assembly perspective view illustrating the 3-D label in accordance with an embodiment of the present invention.
Figure 3:
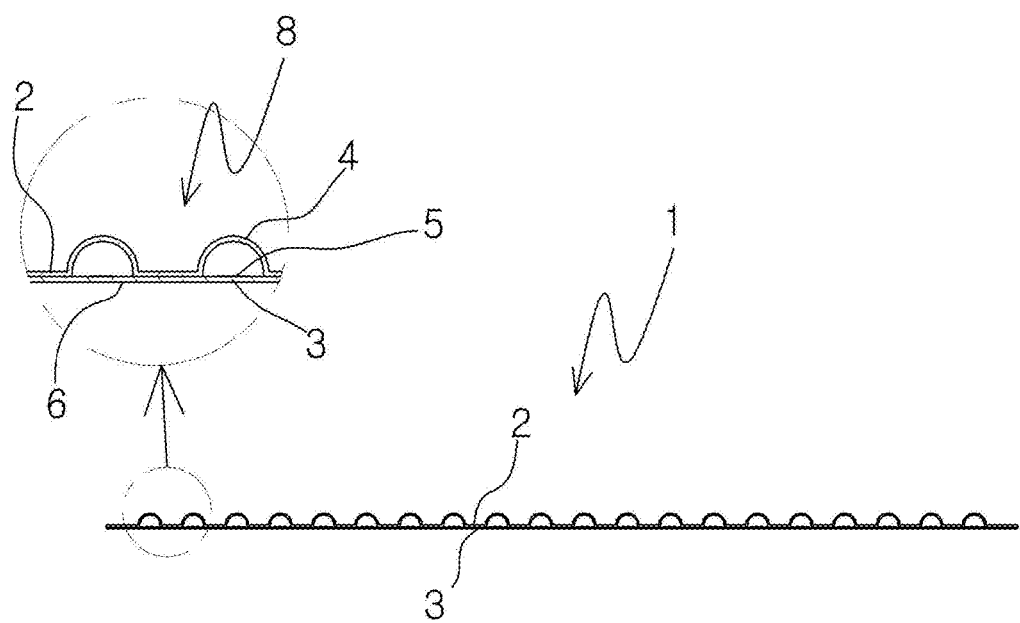
FIG. 3 is a combined cross-sectional view illustrating the 3-D label in accordance with an embodiment of the present invention.

FIG. 1 is a dismantled perspective view illustrating a 3-D label 1 in accordance with an embodiment of the present invention, FIG. 2 is an assembly perspective view illustrating the 3-D label 1 in accordance with an embodiment of the present invention, and FIG. 3 is a combined cross-sectional view illustrating the 3-D label 1 in accordance with an embodiment of the present invention.

The 3-D label 1 in accordance with an embodiment of the present invention includes a lens layer 2 in which a pattern display unit 10 and a secret unit 8 are integrated and formed. The pattern display unit 10 includes a plurality of microlenses 4 that are convex in a semicircumferential form that are arranged at specific intervals and displays patterns formed on a pattern layer 3 regardless of a visual field focal length. The secret unit 8 is formed on one side of the pattern display unit 10 and is configured to display patterns formed and hidden in the pattern layer 3 when a predetermined visual field focal length is reached.

Furthermore, the pattern layer 3 is formed under the lens layer 2 and is configured to have patterns formed thereon so that the distance between the central point of each of the microlenses 4 and the central point of an adjacent microlens 4 is identical with the distance between the central point of each of pattern cells 5 and the central point of an adjacent pattern cell 5 in the state in which the pattern cells 5 that implement patterns in accordance with the respective microlenses 4 are arranged.

The microlenses 4 may reconfigure a planar 2-D image in the form of a 3-D video using an optical illusion principle attributable to binocular disparity. A stereoscopic feeling and various conversion effects of a corresponding image are generated by combining the microlenses 4.

That is, the most important factor of having a stereoscopic feeling is based on the use of binocular disparity that occurs because a person's eyes are spaced apart from each other by about 65 mm in a width direction. If the microlenses 4 are used, a 3-D image effect can be obtained using a 2-D plan image by employing an effect in which some of an image is blocked and an effect in which light selectively travels.

Accordingly, in accordance with an embodiment of the present invention, when the plurality of microlenses 4 that are convex in a semicircumferential form is arranged at specific intervals in the lens layer 2, if the distance between the central point of a microlens 4 and the central point of an adjacent microlens 4 is 25 microns, the distance between the central point of a pattern cell 5 formed in the pattern layer 3 and the central point of an adjacent pattern cell 5 is made 25 microns that are identical with the distance between the microlenses 4. Accordingly, patterns formed of the pattern cells 5 are spread according to an angle of the microlenses 4 that is seen to the naked eye, thereby assigning a stereoscopic feeling.

That is, in order to implement pattern cells 5 placed in the secret unit 8 of the 3-D label 1 so that the pattern cells 5 disappear and appear (i.e., in the form of a latent image) through corresponding microlenses 4, the distance between the central points of the microlenses 4 must be precisely identical with the distance between the central points of the pattern cells 5. The pattern cells 5 need to be designed so that the size of the pattern cell 5 does not exceed that of the pi of the microlens 4 and the interval between the pattern cells 5 needs to be changed within a range of 0.1 micron to 0.01 micron in addition to an existing interval in order to change the size and motion of a secrete image.

Accordingly, if the distance between the pi and central point of the microlens 4 is changed, there is an advantage in that a movement of a letter or design formed in the pattern layer 3 is significantly distinguished due to the change in the distance between the pi and central point of the microlens 4.

In order to reduce the thickness of the 3-D label, the microlenses 4 need to be formed so that the size of the pi of the microlens 4 is 5 microns to 20 microns and the distance between the central points of adjacent microlens 4 is within a range of 6 microns to 25 microns.

Accordingly, in accordance with an embodiment of the present invention, the patterns formed in the pattern layer 3 can be spread to the outside of the microlenses 4 regardless of the focal length of the lens layer 2 and the pattern display unit 10 of the 3-D label 1, a stereoscopic feeling can be assigned by making different the shapes of the patterns according to an angle, and patterns hidden in the secret unit 8 can be checked when a predetermined focal length reaches the naked eye in the state in which the patterns placed in the secret unit 8 are hidden without externally being displayed through the microlenses 4.

Figure 4:
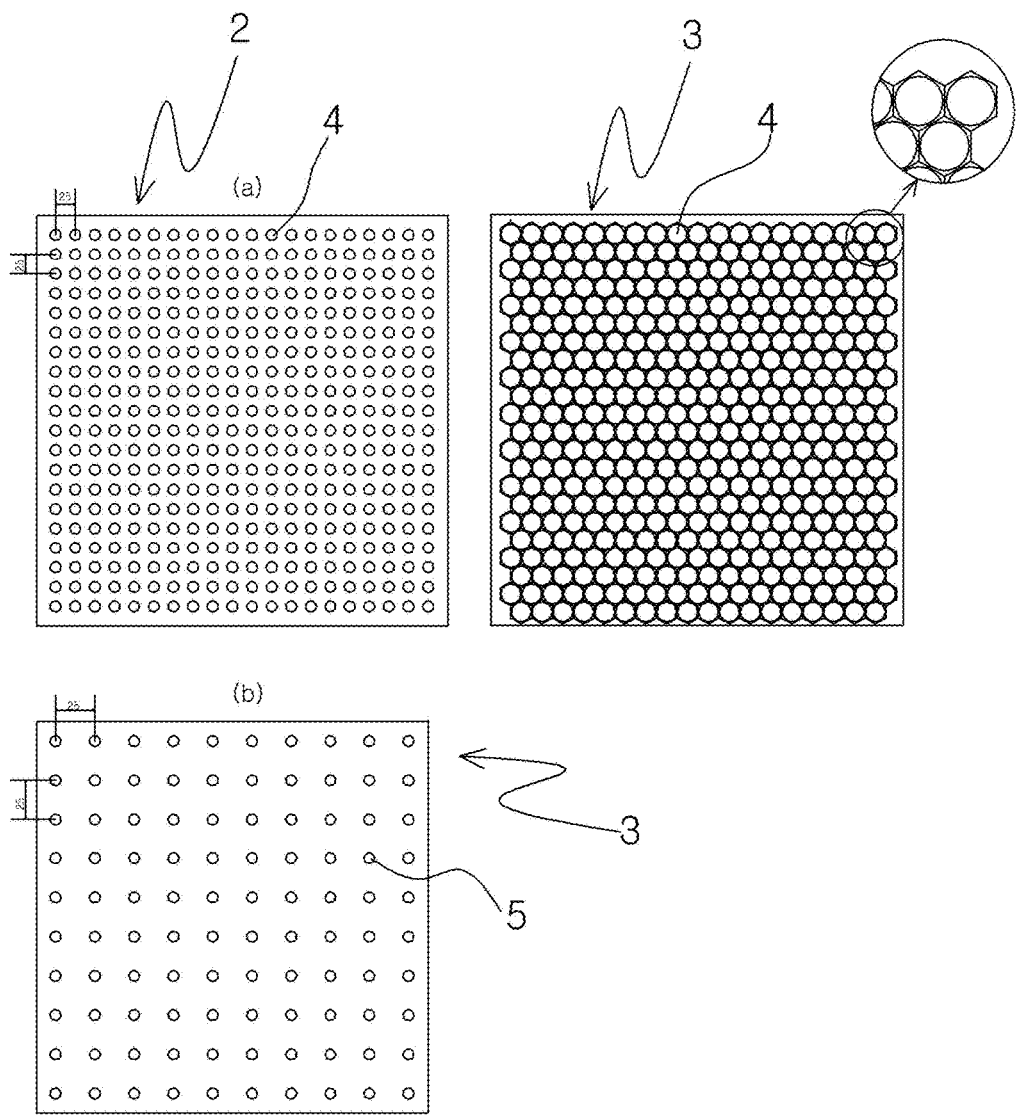
FIG. 4 is plan views illustrating the arrangements of patterns formed in the pattern layer of the 3-D label in accordance with an embodiment of the present invention.

The size of the pattern cell 5 formed in the secret unit 8 may be controlled within a range that does not exceed the pi of the microlens 4. If a predetermined focal length is exceeded, an optical illusion in which a pattern is not seen because magnification is too large may occur. The pattern can be checked only in a precise distance (or magnification). FIG. 4 is plan views illustrating the arrangements of patterns formed in the pattern layer 3 of the 3-D label in accordance with an embodiment of the present invention.

In the 3-D label 1 in accordance with an embodiment of the present invention, as illustrated in FIG. 4(a), if the distance between the central points of the microlenses 4 arranged in the lens layer 2 is 25 microns, the distance between the central points of the pattern cells 5 printed on the pattern layer 3 is identically 25 microns.

Furthermore, as illustrated in FIG. 4(b), if the distance between the central points of the microlenses 4 arranged in the lens layer 2 is 25 microns, the central points of the microlenses 4 are identical with those of the pattern cells 5 because the distance between the central points of the pattern cells 5 is a multiple of 2 although the distance between the central points of the pattern cells 5 formed in the pattern layer 3 is 50 microns. Accordingly, the same function that the pattern cells 5 placed in the secret unit 8 disappear and appear can be obtained, thereby being capable of preventing forgery.

Figure 5:
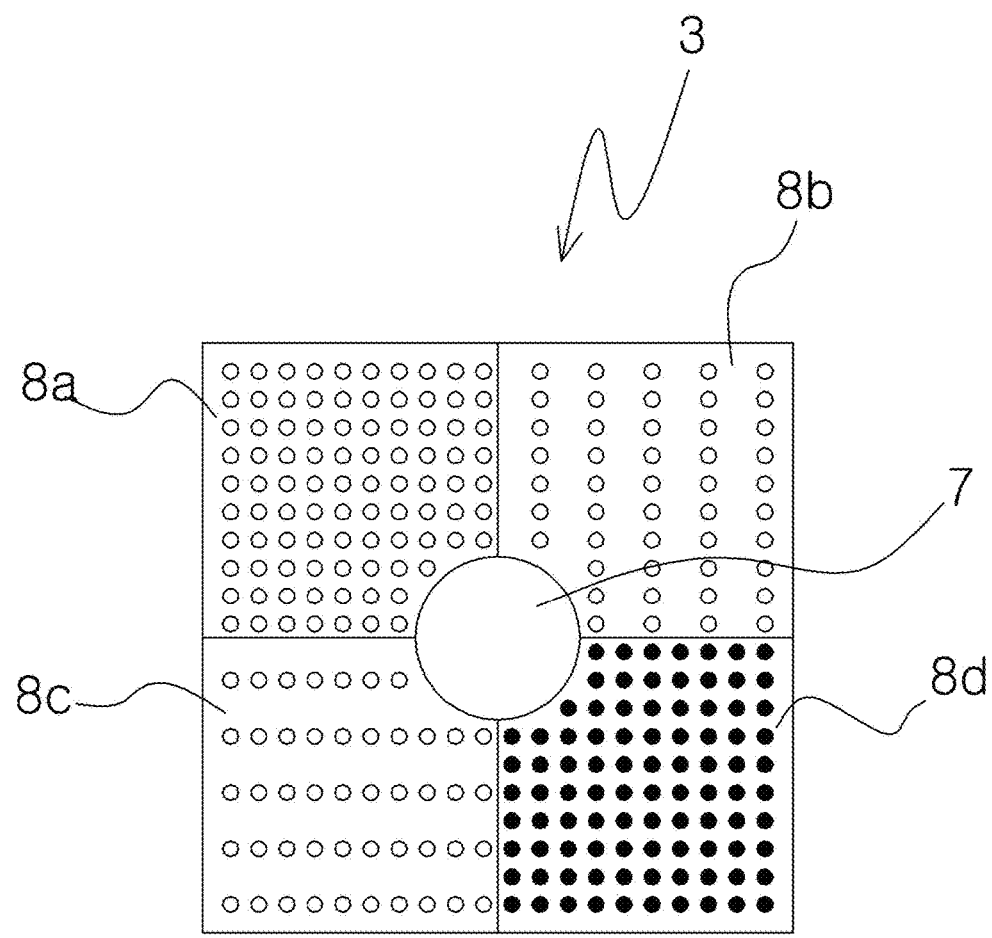
FIG. 5 is a plan view illustrating that the 3-D label is divided into quarters in accordance with an embodiment of the present invention.

Accordingly, although the distance between the central points of the pattern cells 5 is a multiple of 2, 3, or 4 of the distance between the central points of the microlenses 4, the pattern cells 5 can be implemented in the secret unit 8. FIG. 5 is a plan view illustrating that the 3-D label is divided into quarters in accordance with an embodiment of the present invention.

In accordance with an embodiment of the present invention, the 3-D label 1 is divided into quarters. In this case, a logo print region 7 indicative of a logo is placed at the center of the 3-D label 1, a first region 8a and a second region 8b are sequentially placed on the upper right and left sides of the logo print region 7, and third and fourth regions 8c and 8d are sequentially placed from the left side under the logo print region 7.

Furthermore, in order to prevent forgery, patterns placed in the first, the second, the third, and the fourth regions 8a, 8b, 8c, and 8d may be differently formed. If a secret unit is formed in one of the second and the fourth regions 8b and 8d, the blocking of light attributable to a user's head when the user checks the secret unit 8 to the naked eye can be minimized, and thus patterns can be clearly seen.

Figure 6:
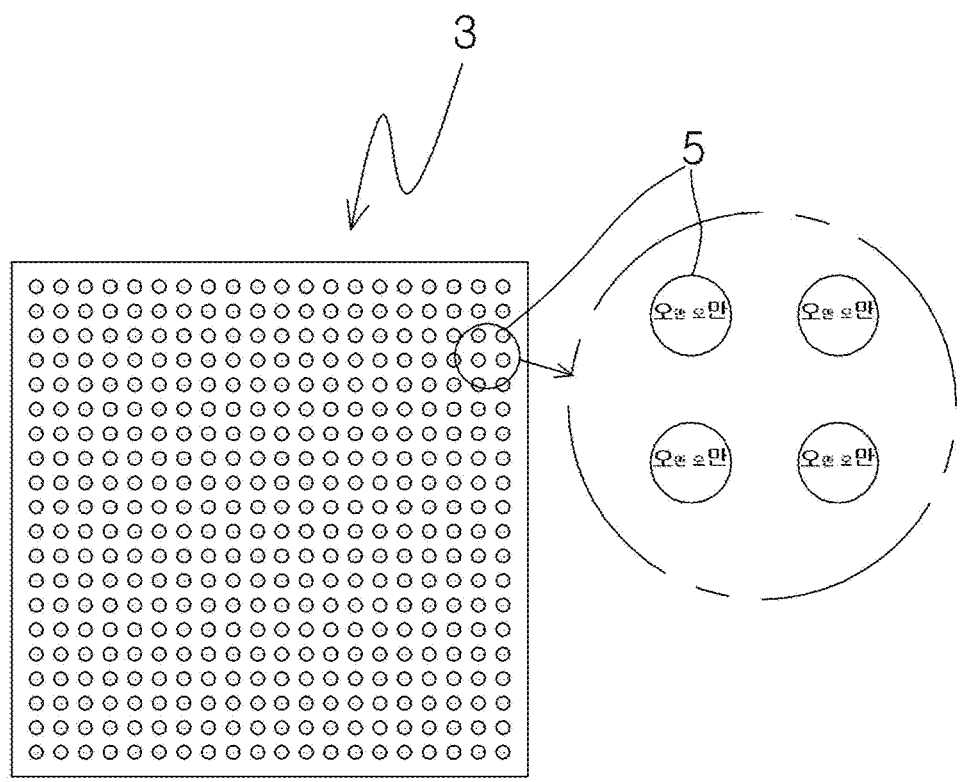
FIG. 6 is a plan view illustrating that the letters of pattern cells printed on the pattern layer of the 3-D label have different sizes in accordance with an embodiment of the present invention.

FIG. 6 is a plan view illustrating that the letters of pattern cells 5 printed on the pattern layer 3 of the 3-D label 1 have different sizes in accordance with an embodiment of the present invention.

Two or more letters or designs are formed in each of the pattern cells 5 placed under the microlenses 4 and configured to have the same central points as the microlenses 4. The two or more letters or designs have different sizes. In this case, when the two or more letters or designs are checked to the naked eye according to a predetermined focal length, letters or designs having a larger size are first seen and letters or designs having a smaller size are later seen. In an embodiment, for example, each pattern cell is divided into two parts, and letters "오단" is represented in each of the two parts as illustrated in FIG. 6. In this case, patterns corresponding to the pattern cells may be consecutively designed so that a letter "오" is large and a letter "단" is small and then a letter "오" is small and a letter "단" is large.

Figure 7:
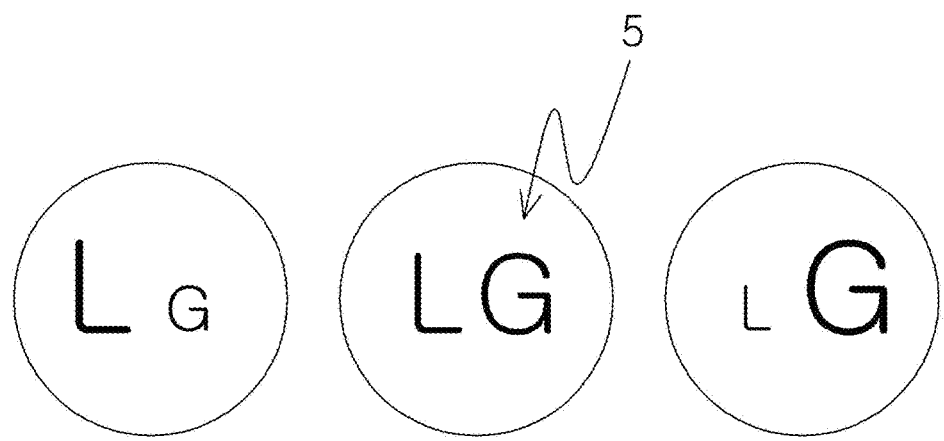
FIG. 7 is a plan view illustrating that each of the pattern cells printed on the pattern layer of the 3-D label is divided into two parts in accordance with an embodiment of the present invention.

In another embodiment, assuming that a pattern corresponding to each pattern cell 5 is "LG" as illustrated in FIG. 7 and the microlens 4 is a 1,016 Line Per Inch (LPI) line so that the pattern disappears or appears through the microlens 4 of the secret unit 8, if the "L" pattern is designed to have 1,017 lines and the "G" pattern is designed to have 1,016 lines, the letter "L" is first recognized and the letter "G" is then recognized when an eye approaches the 3-D label.

In yet another embodiment, in the case of a 3-D pattern, if the microlens 4 is a 1,016 LPI line, the 3-D pattern may be designed to have a 1,010 LPI line lower than the 1,016 LPI line so that the 3-D pattern is moved in a direction opposite a visual field direction and looks like floating. In contrast, the 3-D pattern may be designed to have a 1,022 LPI line higher than the 1,016 LPI line so that a feeling that the 3-D pattern deeply sinks and a feeling that the 3-D pattern comes into sight are obtained.

Furthermore, for example, in the case of "I B K", a pattern corresponding to a pattern cell may be designed so that the size of the letter "I" is reduced and the size of the letter "B" is increased in the case of "I B", and a pattern corresponding to a pattern cell may be designed so that the size of the letter "B" is reduced and the size of the letter "K" is increased in the case of "B K". In this case, "I B K" can be repeatedly implemented so that "I B K" are sequentially created and become distinct in the pattern display unit 10 and the secret unit 8.

FIG. 7 illustrates that each of the pattern cells 5 of the pattern layer 3 is divided into two parts and patterns are designed so that the size of a letter "L" is reduced and the size of a letter "G" is increased within a pattern cell in the 3-D label 1 in accordance with an embodiment of the present invention.

In a 3-D label 1 in accordance with an embodiment of the present invention, the pattern cell 5 placed under the microlens 4 of the secret unit 8 and configured to have the same central point as the microlens 4 may be divided into two parts and the two parts may have different colors so that corresponding patterns are converted.

Figure 8:
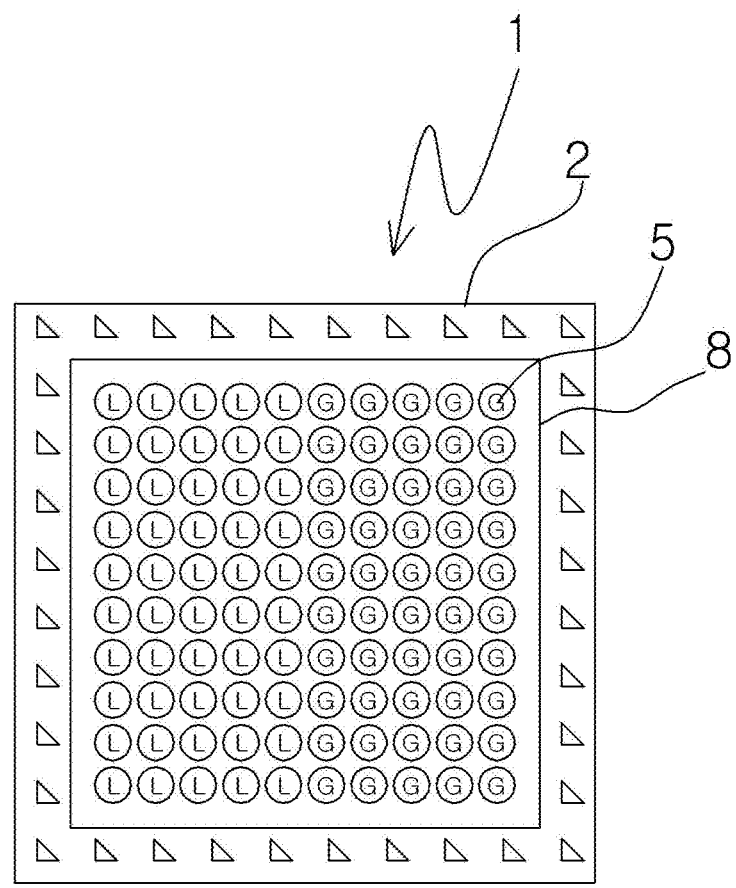
FIG. 8 is a plan view illustrating another embodiment of the pattern layer of the 3-D label in accordance with an embodiment of the present invention.

FIG. 8 is a plan view illustrating another embodiment of the pattern layer 3 of the 3-D label 1 in accordance with an embodiment of the present invention.

In accordance with an embodiment of the present invention, each of the patterns of the secret unit 8 is divided into two parts and the two parts have different letters or designs. In this case, the same letters or designs may be arranged on one side, letters or designs different from the letters or designs on one side may be selected and arranged on the other side so that patterns on one side are different from those on the other side. Accordingly, the patterns on one side and the patterns on the other side are alternately seen to the naked eye according to an angle of the microlenses 4 placed in the secret unit 8 of the 3-D label 1. Accordingly, in accordance with an embodiment of the present invention, a movement of patterns can be implemented in all directions other than a single direction, and the patterns can be easily changed.

For example, patterns placed in the secret unit 8 in addition to patterns placed in the pattern display unit 10 can be changed in various forms, such as a circle, a triangle, and a square. When the 3-D label 1 is brought close to an eye, patterns hidden in the secret unit 8 can be easily checked. Accordingly, a product purchaser or user can easily check whether or not a corresponding article is a genuine article. The microlenses 4 and patterns of the 3-D label 1 in accordance with an embodiment of the present invention can be mass-produced by simultaneous UV forming through the convergence of an inmold printing technology.

Furthermore, the lens layer 2 may be made of UV resin, polyethylene terephthalate, polycarbonate, epoxy, or acrylic resin. The patterns are formed under at the bottom of the microlens 4 using an embossed mold.

Furthermore, offset-printed patterns may be formed in the microlenses 4 using resin and a hot stamping method may be then performed. Resin having a refractive index different from that of the microlenses 4 may be hard coated on top of the microlenses 4 in order to increase the sharpness of fine patterns.

Furthermore, the microlenses 4 may be made of soft or hard materials depending on its materials, and the color of the 3-D label may be controlled by adding pigments to color ink or resin.

The bottom of the pattern layer 3 may be deposited and finished in order to make the patterns sharper.

Furthermore, in accordance with an embodiment of the present invention, the pattern cells 5 may be implemented to disappear and appear in the secret unit 8 using a method of making the distance between the central points of adjacent microlenses 4 identical with the distance between the central points of corresponding adjacent pattern cells 5. Accordingly, the thickness of the 3-D label can be freely controlled from 0.01 mm to 2 mm to which a compensation thickness is added.

Figure 9:
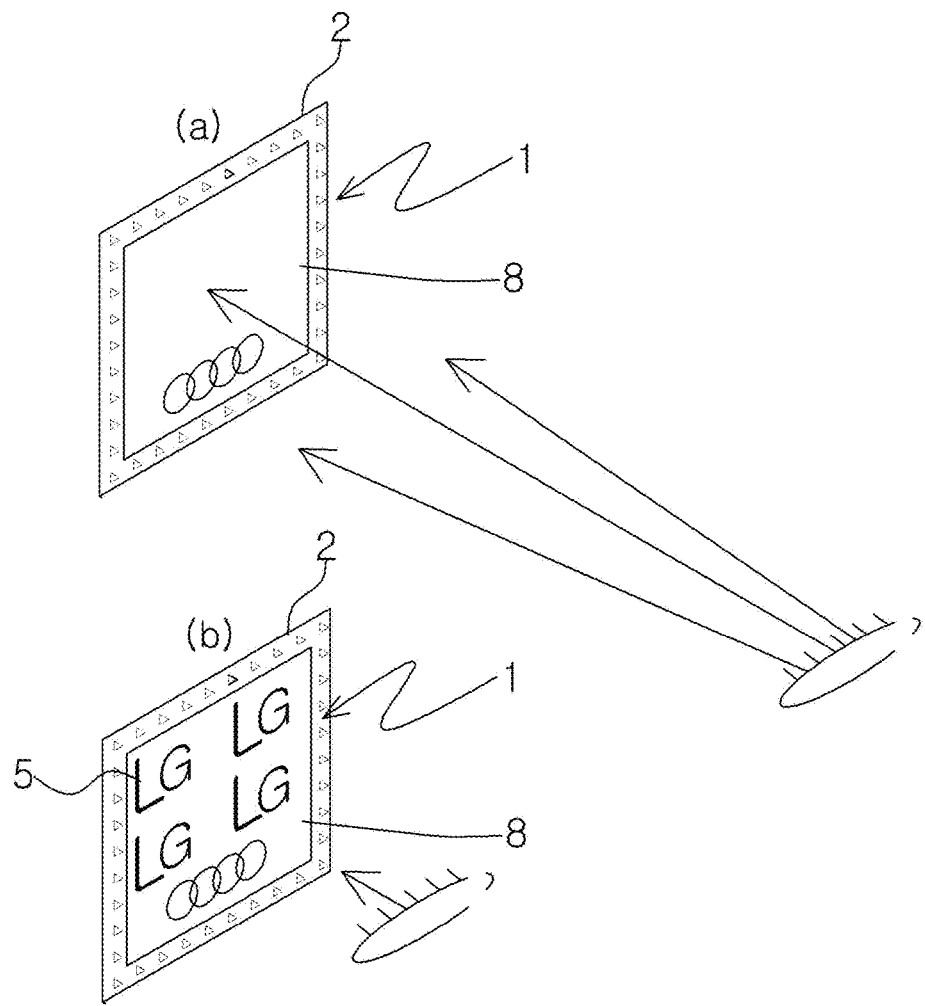
FIG. 9 is a perspective view illustrating that the pattern cells of a secret unit are used in the 3-D label in accordance with an embodiment of the present invention.
Figure 10A:
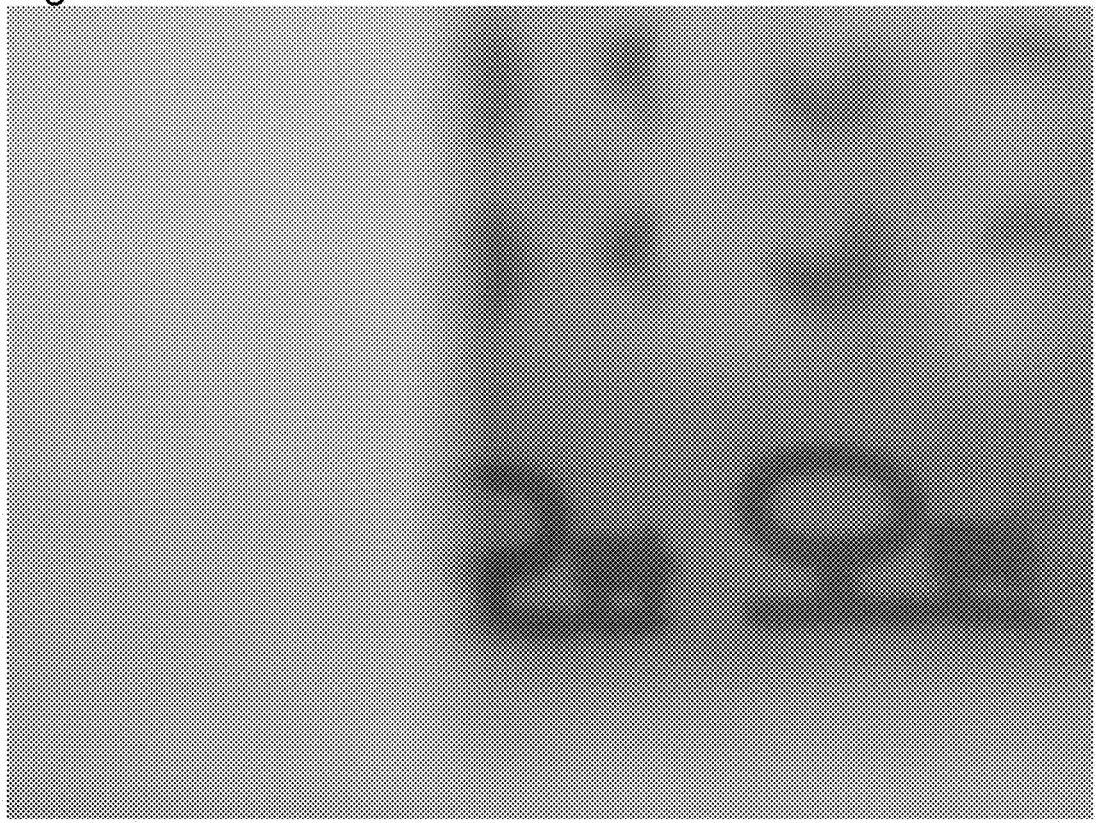
FIGS. 10a and 10b are photographs illustrating an embodiment of the secret unit in the 3-D label in accordance with an embodiment of the present invention.
Figure 10B:
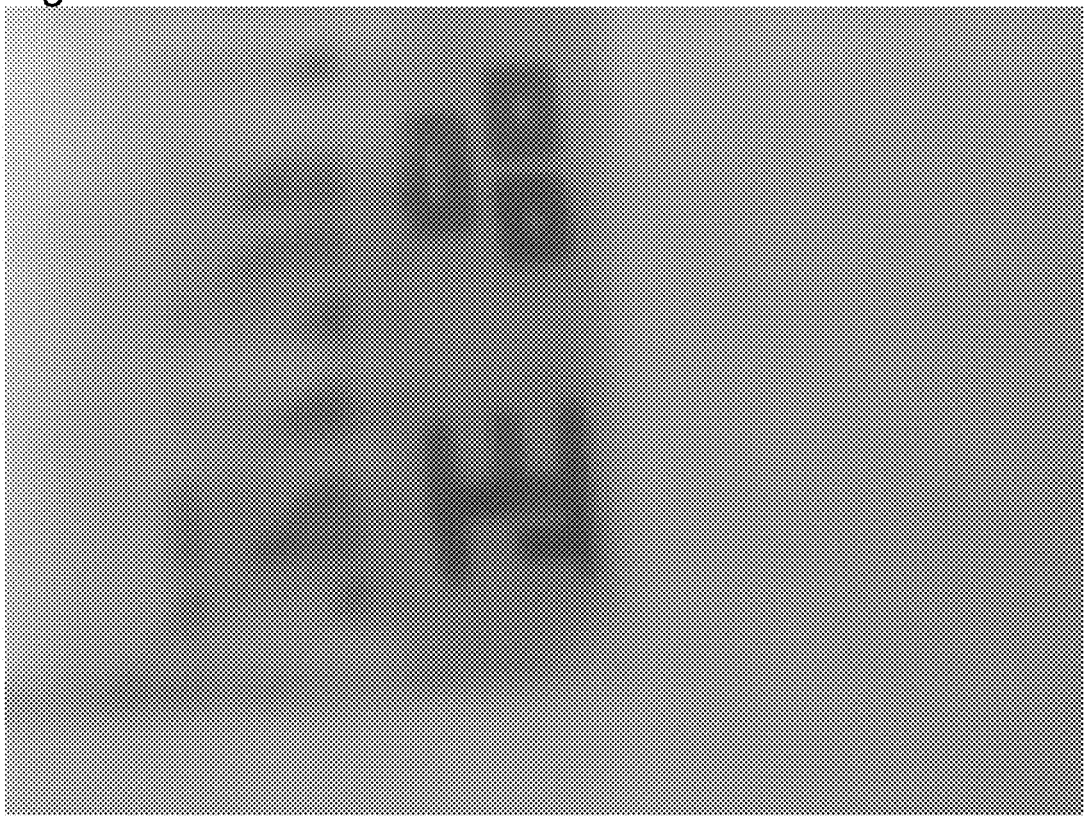

FIG. 9 is a perspective view illustrating that the pattern cells 5 of the secret unit 8 are used in the 3-D label 1 in accordance with an embodiment of the present invention, and FIGS. 10a and 10b are photographs illustrating an embodiment of the secret unit 8 in the 3-D label 1 in accordance with an embodiment of the present invention.

The 3-D label 1 in accordance with an embodiment of the present invention may be implemented in a thin film form. The 3-D label may be attached to various products, such as money, bank bills, securities, passports, identification cards, cards, watches, caps, bags, clothes, bottles, and electronic goods, and may be used to check whether or not a corresponding article is a genuine article.

Accordingly, pattern cells 5 intended through the secret unit 8 can be checked only in a predetermined focal length by performing control through a fine pattern design so that patterns placed in the secret unit 8 are not seen although the 3-D label 1 is seen to the naked eye if a focal length is not a predetermined focal length and bringing the 3-D label 1 close to an eye.

Figure 11:
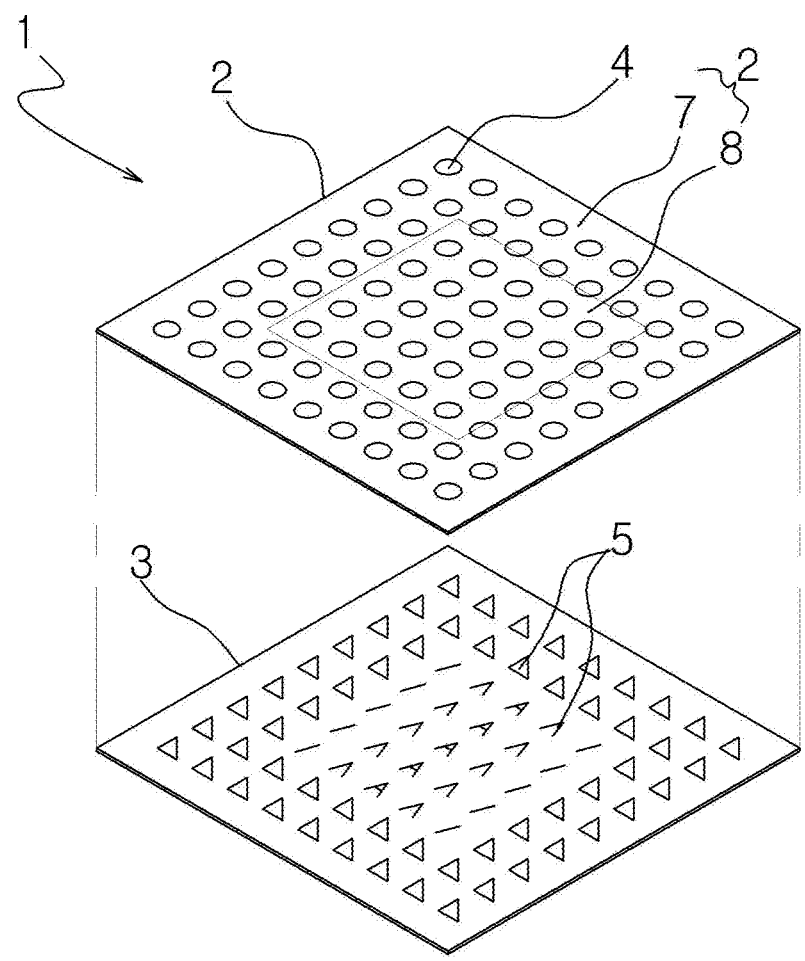
FIG. 11 is a dismantled perspective view illustrating that patterns move in the 3-D label in accordance with another embodiment of the present invention.
Figure 12:
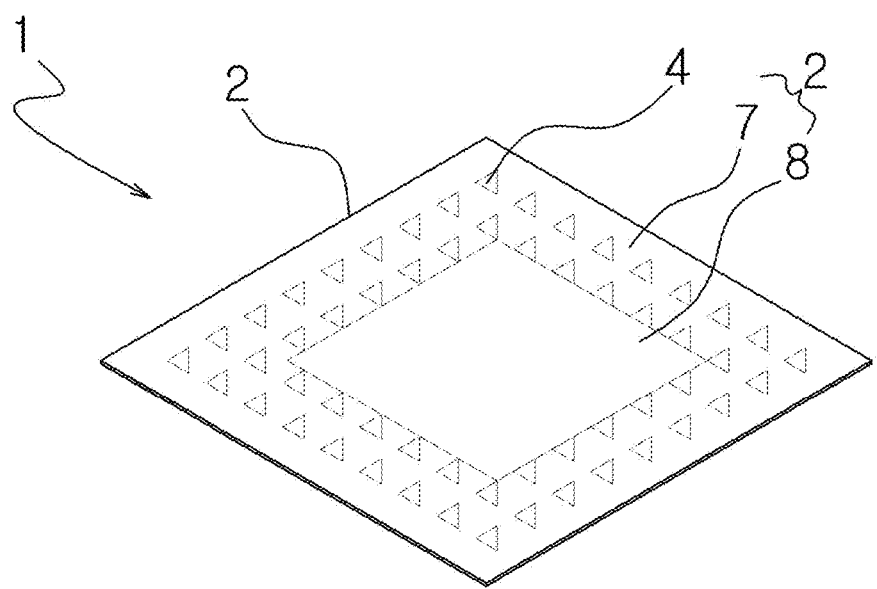
FIG. 12 is an assembly perspective view illustrating the 3-D label in which patterns move in accordance with an embodiment of the present invention.
Figure 13:
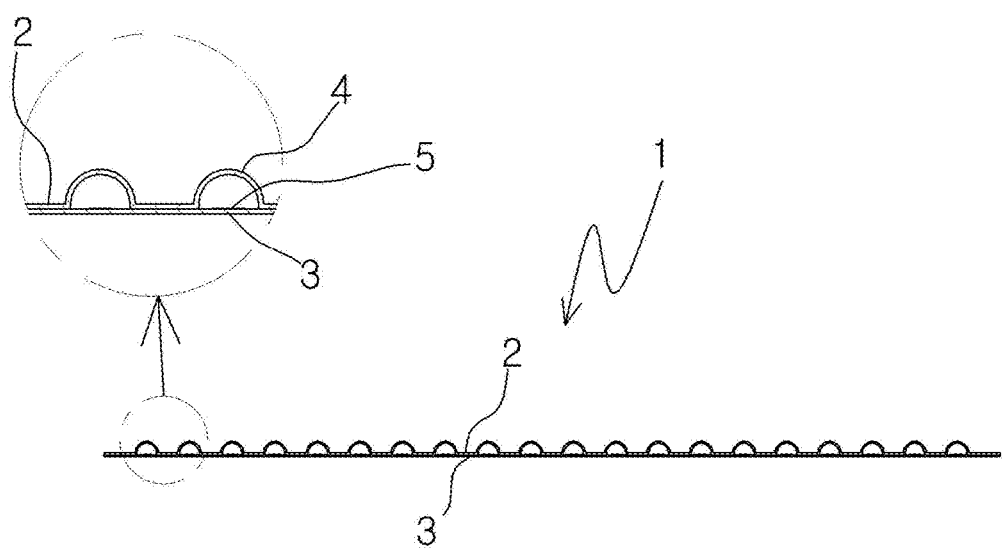
FIG. 13 is a combined cross-sectional view illustrating the 3-D label in which patterns move in accordance with an embodiment of the present invention.
Figure 19:
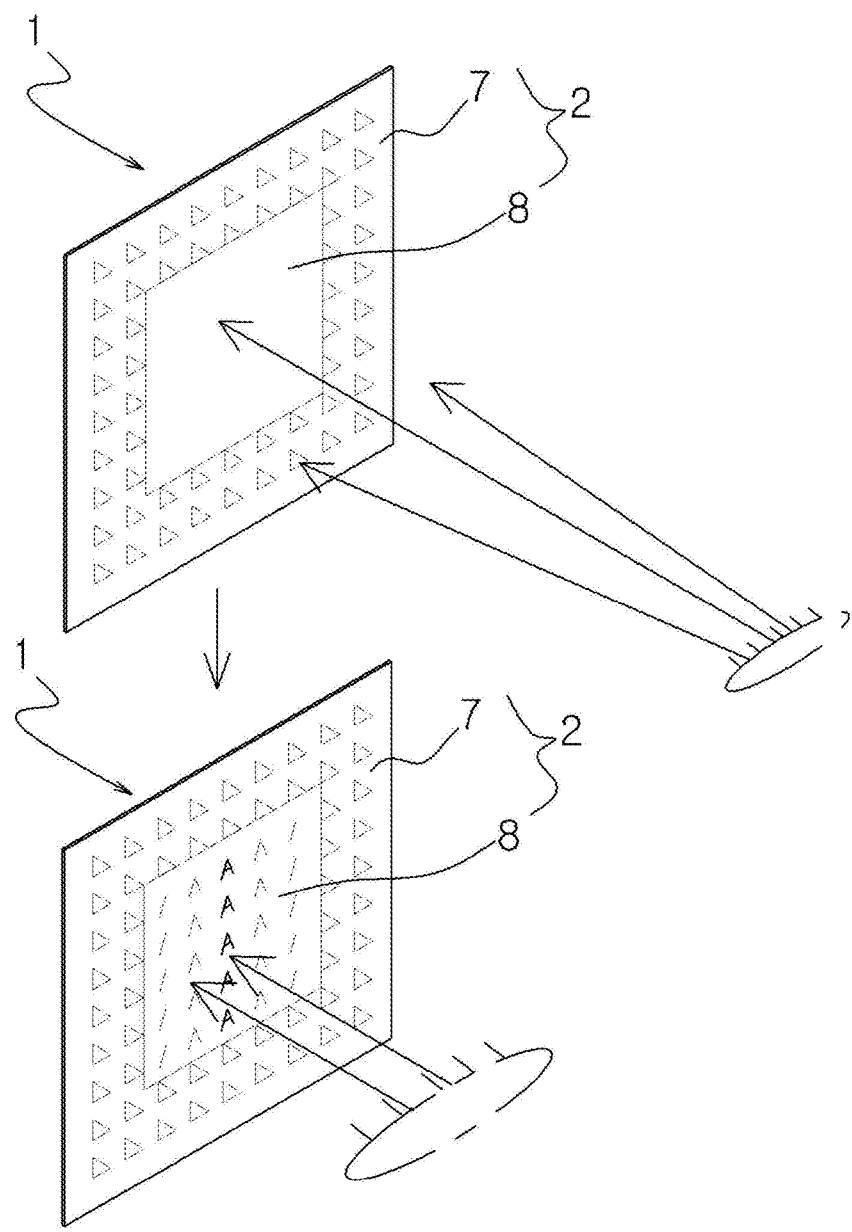
FIG. 19 is a perspective view illustrating an embodiment of the 3-D label in which patterns move in accordance with an embodiment of the present invention.

FIG. 11 is a dismantled perspective view illustrating that patterns move in the 3-D label 1 in accordance with another embodiment of the present invention, FIG. 12 is an assembly perspective view illustrating the 3-D label 1 in which patterns move in accordance with an embodiment of the present invention, FIG. 13 is a combined cross-sectional view illustrating the 3-D label 1 in which patterns move in accordance with an embodiment of the present invention, and FIG. 19 is a perspective view illustrating an embodiment of the 3-D label 1 in which patterns move in accordance with an embodiment of the present invention.

The 3-D label 1 in accordance with another embodiment of the present invention is attached to various products, such as money, bank bills, securities, passports, identification cards, cards, watches, caps, bags, clothes, bottles, and electronic goods, and is configured to check whether or not a corresponding article is a genuine article based on patterns that move according to a change in the angle of a focal point when a predetermined visual field focal length is reached. The 3-D label 1 includes a lens layer 2 in which a pattern display unit 9 and a secret unit 8 are integrated and formed. The pattern display unit 9 includes a plurality of microlenses 4 that are convex in a semicircumferential form that are arranged at specific intervals and displays patterns formed on a pattern layer 3 regardless of a visual field focal length. The secret unit 8 is formed on one side of the pattern display unit 9 and is configured to display patterns formed and hidden in the pattern layer 3 when a predetermined visual field focal length is reached.

Furthermore, the pattern layer 3 is formed under the lens layer 2 and is configured to have patterns formed thereon so that the distance between the central point of each of the microlenses 4 and the central point of an adjacent microlens 4 is identical with the distance between the central point of each of pattern cells 5 and the central point of an adjacent pattern cell 5 in the state in which the pattern cells 5 that implement patterns in accordance with the respective microlenses 4 are arranged.

An optical illusion is generated in patterns placed under the secret unit 8 due to the plurality of pattern cells 5 that are consecutively printed in order to form the patterns. The pattern cells 5 form the pattern layer 3 in which the distance between the central point of a microlens 4 and the central point of an adjacent microlens 4 is identical with the distance between the central point of a pattern cell 5 and the central point of an adjacent pattern cell 5.

Accordingly, if the distance between the central point of the microlens 4 and the central point of the adjacent microlens 4 is precisely matched with the distance between the central point of the pattern cell 5 and the central point of the adjacent pattern cell 5, patterns having various shapes can be implemented.

Furthermore, in order to have an optical illusion as if patterns placed in the secret unit 8 move according to a change in the angle of a focal point, the pattern cells 5 may be arranged in such a manner that patterns are predetermined and then formed in a forward direction and after the patterns are completed, patterns are formed in a backward direction so that the patterns disappear after they are created.

Furthermore, the pattern cells 5 may be arranged so that the shapes of patterns are differently changed, the pattern cells 5 may be arranged so that the sizes of patterns are changed, the pattern cells 5 may be designed and arranged by gradually changing the angles of patterns so that the patterns are moved 360°, or the pattern cells 5 may be arranged step by step so that the pattern of a shape of a thing moves.

Accordingly, there is an advantage in that a 3-D moving image having moving patterns can be provided by a combination of the patterns consecutively arranged as described above and the microlenses 4 using an optical illusion principle attributable to binocular disparity.

The size of the pi of the microlens 4 may be 5 microns to microns, the distance between the central points of adjacent microlenses may be within a range of 6 microns to 25 microns, and the thickness of the 3-D label 1 may be made to a thin film level by shaping the microlenses 4.

Accordingly, in order for patterns formed in the 3-D label 1 to move, a minimum pi of the microlens 4 capable of maintaining the characteristics of the microlens 4 needs to be about 5 microns, and the distance between a microlens 4 and an adjacent microlens 4 with an interval of 1 micro placed between the microlenses 4 needs to be 6 microns.

In this case, 17.9 million microlenses 4 are formed in width of 1 inch and length of 1 inch of the 3-D label 1. 1.32 million microlenses 4 are formed in the 3-D label 1 in which the distance between a microlens 4 and an adjacent microlens 4 is 25 microns.

Accordingly, in accordance with an embodiment of the present invention, the 3-D label 1 having a visual effect as if a moving image is seen according to the angle of a focal point can be produced by changing the pattern cells 5 placed under the microlenses 4 by noticing the principle of a projector that photographs 24 frames per second and that 14,400 figures are theoretically required to create animation of 10 minutes.

Figure 14:
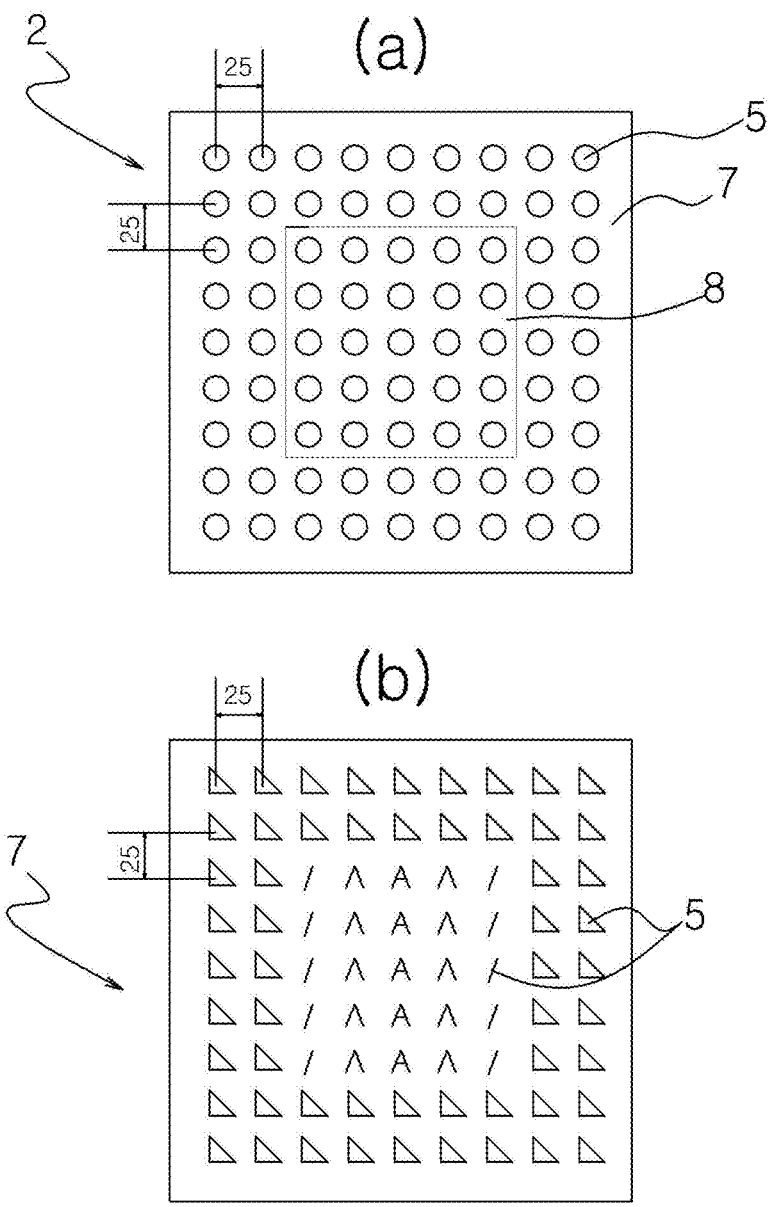
FIG. 14 is a plan view illustrating the patterns of the 3-D label in which patterns move in accordance with an embodiment of the present invention.

FIG. 14 is a plan view illustrating the patterns of the 3-D label 1 in which patterns move in accordance with an embodiment of the present invention.

An embodiment of the present invention may have an effect in which a moving image is implemented as if patterns move due to an optical illusion in such a manner that patterns hidden in the secret unit 8 appear when a predetermined focal length is reached, created patterns disappear when the angle of a focal point is different, and the patterns are generated again.

What patterns are created and then disappear as described above is performed because the pattern cells 5 formed by a combination of the patterns are consecutively formed, patterns are formed in a forward direction, and after the patterns are completed, patterns are formed in a backward direction again. In relation to the embodiment, for example, in the case of "A", a first pattern cell 5 in a first row may form a line in the direction of slant on the left side, a second pattern cell 5 may form a line on the right side symmetrically to the line on the left side, "A" may be formed in a third pattern cell 5, and the pattern cells 5 may be separated from each other in fourth and fifth places in reverse order.

Furthermore, like in the first row, a plurality of the pattern cells 5 may be arranged in a column direction in order to increase sharpness.

Figure 15A:
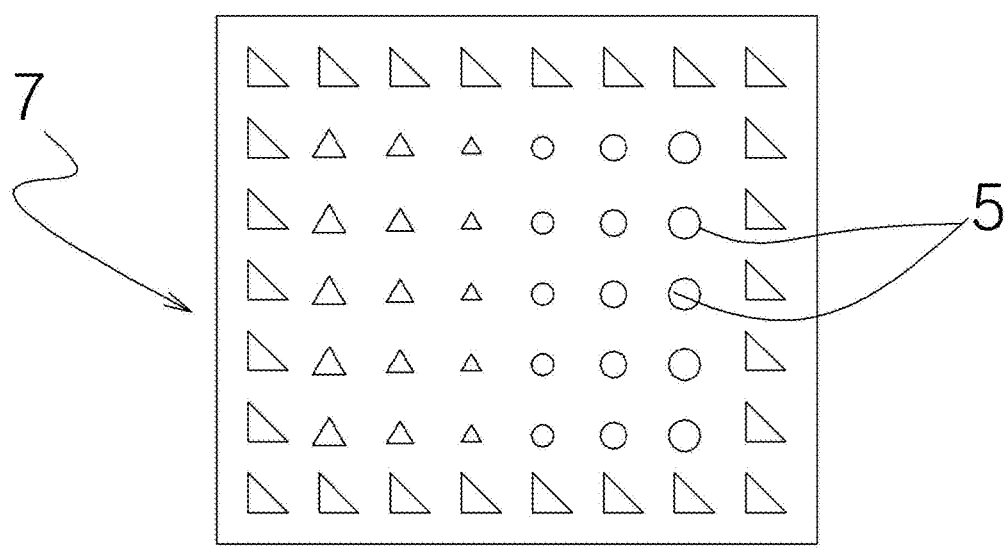
FIGS. 15a and 15b are plan views illustrating another embodiment of patterns in the 3-D label in which patterns move in accordance with an embodiment of the present invention.
Figure 15B:
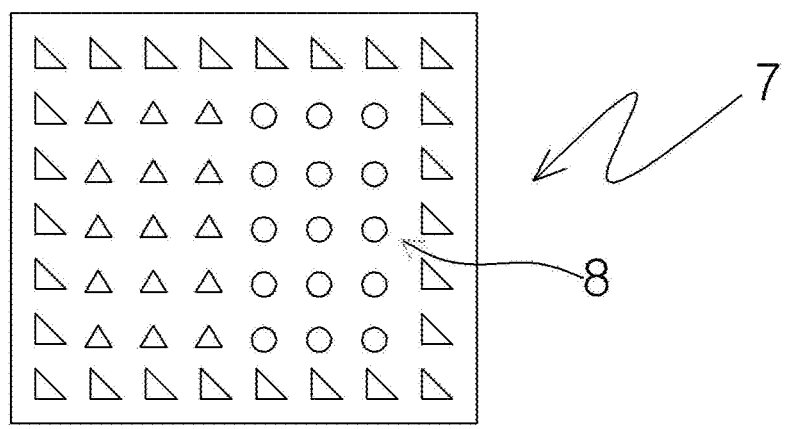

FIGS. 15a and 15b are plan views illustrating another embodiment of patterns in the 3-D label 1 in which patterns move in accordance with an embodiment of the present invention.

In accordance with an embodiment of the present invention, the pattern cells 5 may be arranged so that the shapes of patterns placed in the secret unit 8 are differently changed.

In order for the shapes of the patterns to be differently changed as described above, the pattern cells 5 need to be consecutively arranged so that they are gradually reduced and gradually increased in size.

That is, in an embodiment for changing patterns, in order for the shapes of patterns to be changed from "Δ" to "○", in a first row, a first triangle may be formed in a first pattern cell 5, a second triangle smaller than that of the first pattern cell 5 may be formed in a second pattern cell 5, a third triangle smaller than the second triangle may be formed in a third pattern cell 5, a circle may be formed in a fourth pattern cell 5, a circle greater than that of the fourth pattern cell 5 may be formed in a fifth pattern cell 5, and a circle greater than that of the fifth pattern cell 5 may be formed in a sixth pattern cell 5. Accordingly, a movement of corresponding patterns can be visually felt according to a change from a triangle to a circle as the angle of a focal point of the 3-D label 1 is changed.

In this case, a change of the patterns can be visually felt although the triangle and the circle have the same size. Furthermore, like in the first row, a plurality of the pattern cells 5 may be arranged in a column direction in order to increase sharpness.

Figure 16:
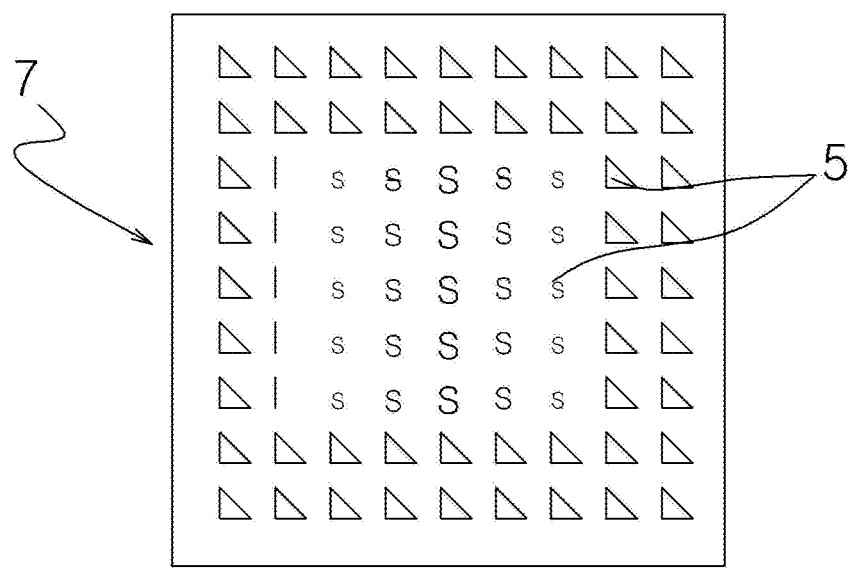
FIG. 16 is a plan view illustrating another embodiment of patterns in the 3-D label in which patterns move in accordance with an embodiment of the present invention.

FIG. 16 is a plan view illustrating another embodiment of patterns formed in the 3-D label 1 in which patterns move in accordance with an embodiment of the present invention. In accordance with an embodiment of the present invention, the pattern cells 5 having different sizes are repeatedly arranged so that patterns move with varying sizes.

In the embodiment, for example, in the case of a letter "S", in a first row, letters S having the smallest size may be formed in first and fifth pattern cells 5, letters S having a middle size may be formed in second and fourth pattern cells 5, and letter S having the greatest size may be formed in a third pattern cell 5. Accordingly, a movement in the size of corresponding patterns can be visually felt according to a change in the angle of a focal point of the 3-D label 1.

Furthermore, like in the first row, a plurality of the pattern cells 5 may be formed in a column direction in order to increase sharpness.

Figure 17:
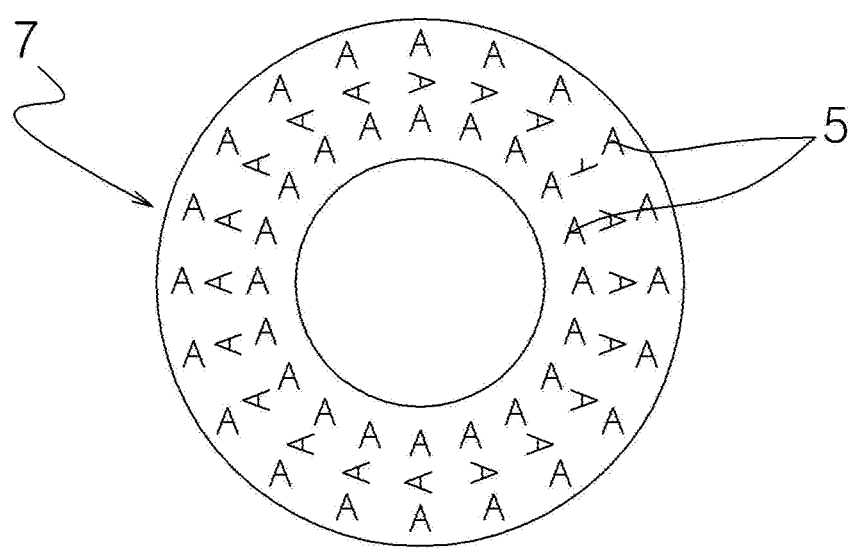
FIG. 17 is a plan view illustrating another embodiment of patterns in the 3-D label in which patterns move in accordance with an embodiment of the present invention.

FIG. 17 is a plan view illustrating another embodiment of patterns in the 3-D label 1 in which patterns move in accordance with an embodiment of the present invention. In accordance with an embodiment of the present invention, the pattern cells 5 in which patterns are formed step by step so that they move 360° are circularly arranged.

In the embodiment, for example, in the case of ∧, the pattern cells 5 may be placed at the edge in the form of ∧ the pattern cells 5 may be formed in one half of a next edge in the form of < and in the form of > in the other half of the next edge, and the pattern cells 5 may be sequentially arranged at the innermost edge in the form of ∨. Accordingly, a rotating movement of the shapes ∧ of patterns can be checked regardless of the direction of the angle of a focal point.

Figure 18:
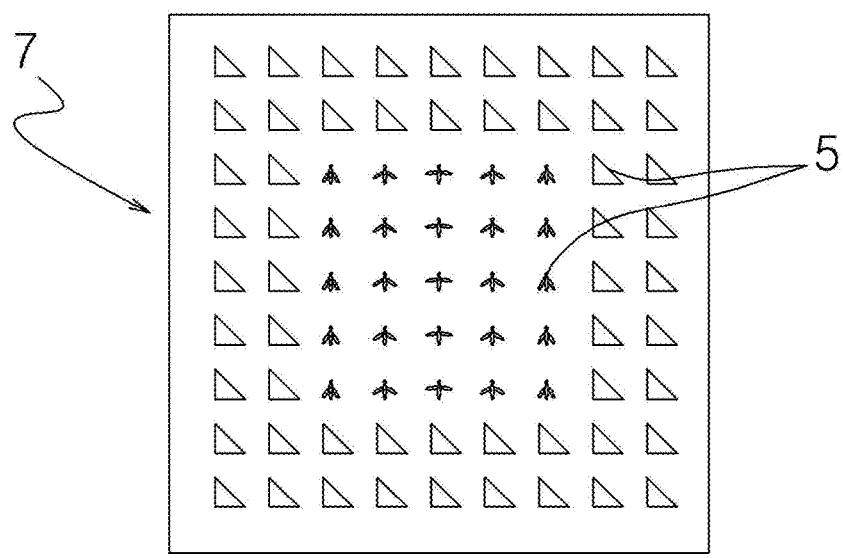
FIG. 18 is a plan view illustrating another embodiment of patterns in the 3-D label in which patterns move in accordance with an embodiment of the present invention.

FIG. 18 is a plan view illustrating another embodiment of patterns formed in the 3-D label 1 in which patterns move in accordance with an embodiment of the present invention. In accordance with an embodiment of the present invention, the arrangement of patterns placed in the secret unit 8 is formed in the form of a thing in order to represent a movement as if the thing moves.

In accordance with an embodiment of the present invention, the pattern cells 5 may be arranged step by step so that patterns move.

Accordingly, for example, in the case of the wings of an animal, the pattern cells 5 in which the wings have different locations in the first to the fifth places of a first row may be consecutively formed in order to represent a movement of the wings according to a change of the angle of a focal point. Accordingly, characters, patterns, logos, characters, and animation can be implemented in the secret unit 8 so that they move, and the 3-D label 1 may be attached to money, bank bills, securities, passports, identification cards, cards, watches, caps, bags, clothes, bottles, and electronic goods. Furthermore, the present invention provides a 3-D label in which a movement of intended patterns can be visually field according to a predetermined visual field focal length and a change of the angle of a focal point through the secret unit in addition to the pattern display unit.

As described above, the 3-D label using fine patterns and the microlens in accordance with an embodiment of the present invention is advantageous in that it can be easily fabricated because the 3-D label includes the lens layer and the pattern layer. Furthermore, the 3-D label using fine patterns and the microlens is advantageous in that the microlenses and patterns can be spread or converged according to their angles because the distance between the central points of the microlenses consecutively arranged is matched with the distance between the central points of the pattern cells that form the patterns and letters or designs can be hidden because the pattern cells formed of letters or designs are spread to a maximum extent when the center of the microlens is precisely identical with that of the pattern cell. Furthermore, the 3-D label using fine patterns and the microlens is advantageous in that letters or designs to be represented can be distinguished to the naked eye of a person when the naked eye is brought close to the microlenses and a predetermined visual field focal length is reached.

Furthermore, the present invention is advantageous in that the pattern cells disappear and appear as described above when the central points of the pattern cells are matched with the central points of the microlenses because the pattern cells are arranged so that the distance between the pattern cells is a multiple of 2 or 3 of the distance between the central points of the microlenses.

In contrast, the same advantage may be achieved although the microlenses are arranged so that the distance between the central points of the microlens is a multiple of 2 or 3 of the central points of the pattern cells.

Accordingly, the present invention is advantageous in that productivity and workability can be improved because a process of fabricating a 3-D label in which patterns move can be reduced, a forgery task is difficult because a stereoscopic feeling is implemented through the microlenses according to the sizes, shapes, and arrangement angles of formed patterns, and a genuine article can be easily checked.

Furthermore, the present invention is advantageous in that pattern designs, such as two patterns or three patterns, can be variously performed because patterns are moved in all direction in addition to a single direction and the patterns are changed in various ways.

Furthermore, patterns hidden in the secret unit are advantageous in that they have a function of a label for an efficient forgery prevention technology or a label for certifying a genuine product because the patterns do not require a reader unlike barcode or QR code and can be directly checked to the naked eye of a person regardless of time and place.

Furthermore, the present invention is advantageous in that the 3-D label can be attached to various products, such as money, bank bills, securities, passports, identification cards, cards, watches, caps, bags, clothes, bottles, and electronic goods, and used to check whether or not a corresponding article is a genuine article because the 3-D label can be fabricated and implemented in the form of a thin film through a single process using fine lenses having a minimum diameter of 5 microns and an inmold printing technology.

What is claimed is:

1. A 3-D label for generating an optical illusion to check genuineness and prevent forgery of an article, comprising:
 a lens layer having a plurality of microlenses that each have a hemispherical top surface, the lens layer including a portion for displaying a pattern formed and hidden in a pattern layer when viewed at a predetermined visual field focal length, wherein the pattern is displayed as an optical illusion in which the pattern moves according to a change of an angle of a focal point;
 the pattern layer disposed under the lens layer and having a plurality of pattern cells arranged along first, second and third concentric circles;
 wherein each of the pattern cells arranged along the first and third concentric circles includes a first image; and
 wherein each of a first set of pattern cells arranged along one half of the second concentric circle includes a second image, each of a second set of pattern cells arranged along another half of the second concentric circle includes a third image, the second image is obtained by rotating the first image by 90 degrees in a counterclockwise direction, and the third image being is obtained by rotating the first image by 90 degrees in a clockwise direction.

* * * * *